United States Patent
Wu

(10) Patent No.: US 6,944,641 B2
(45) Date of Patent: *Sep. 13, 2005

(54) METHOD FOR DETERMINING THE SQUARE ROOT OF A LONG-BIT NUMBER USING A SHORT-BIT PROCESSOR

(75) Inventor: Sheng-Hung Wu, Taichung Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 658 days.

This patent is subject to a terminal disclaimer.

(21) Appl. No.: 09/981,729

(22) Filed: Oct. 19, 2001

(65) Prior Publication Data

US 2003/0028573 A1 Feb. 6, 2003

(30) Foreign Application Priority Data

Jul. 24, 2001 (TW) ........................................ 90117974 A

(51) Int. Cl.[7] ................................................ G06F 7/38

(52) U.S. Cl. ........................................................ 708/605
(58) Field of Search ................................. 708/500, 605

(56) References Cited

U.S. PATENT DOCUMENTS

| 4,949,296 A | * | 8/1990 | Malinowski | ................. 708/605 |
| 5,159,566 A | * | 10/1992 | Briggs et al. | ................ 708/605 |
| 5,386,375 A | * | 1/1995 | Smith | ......................... 708/500 |
| 6,625,632 B1 | * | 9/2003 | Kotlov | ........................ 708/500 |

* cited by examiner

*Primary Examiner*—Chuong D Ngo
(74) *Attorney, Agent, or Firm*—Jianq Chyun IP office

(57) ABSTRACT

In a method for determining the square root of a long-bit number using a short-bit processor, the long-bit number is assumed to be $c \times 2^{2K} + d$, where $c, d < 2^{2k}$, and its solution is assumed to be $(a \times 2^K + b)^2$. The 'a' is determined by using a bisection method to obtain the floor value of the square root of 'c'. In order to obtained the value of 'b', there is derived a successive substitution equation: $b_{[n]} = (c-a^2) \times 2^{2k} + (d - b_{[n-1]}^2) / 2^{2(k+1)}$. An initial value is given to 'b' to execute the successive substitution equation recursively several times until the equation is convergent.

8 Claims, 1 Drawing Sheet

METHOD FOR DETERMINING THE SQUARE ROOT OF A LONG-BIT NUMBER USING A SHORT-BIT PROCESSOR

BACKGROUND OF THE INVENTION

1. Field of the Invention

The present invention relates to a method for determining the square root of a number using a processor, more particularly, to a method using a short-bit processor, such as an 8-bit processor, to determine the square root of a long-bit number, such as a 16-bit or 32-bit number.

2. Description of Related Art

In applications using an 8-bit microprocessor, such as Intel 8051, it is very common to execute an operation to determine the square root of a number. Typically, the square root of a number is obtained by using a Euclid's algorithm or a bisection method. However, the use of the Euclid's algorithm is time-consuming because multiple data shifting operations are required. As to the bisection method, due to the fact that the data width of the processor is short-bited, as 8-bit, this short-bit data has to be rearranged to long-bited, as 16-bit, data for being processed, and thus the operation is also time-consuming. Particularly, in some real-time applications, such as CD/DVD jump track calculation, the system performance is likely to be degraded significantly in using these conventional methods.

In order to solve the aforementioned problem, a lookup table and its due interpolation method can be employed. The use of such a lookup table is direct and requires no heavy operation step, and the result obtained by using the lookup table is acceptable. However, the use of lookup table encounters a problem occupying a large memory space. Particularly, in the CD/DVD drive tracking application, there need three lookup tables for the general CD, single layer DVD and double layer DVD, and thus the memory space required is considerable. Accordingly, there is a desire to have a novel method to mitigate and/or obviate the aforementioned problems.

SUMMARY OF THE INVENTION

The object of the present invention is to provide a method capable of determining the square root of a long-bit number by using a short-bit processor.

In accordance with one aspect of the present invention, the method of the present invention comprises the steps of: (A) assuming the long-bit number to be $c \times 2^{2K}+d$, where c, $d<2^{2k}$, and its square-root solution to be $(a \times 2^K+b)$; (B) finding 'a' by using a bisection method to obtain the floor value of the square root of 'c'; (C) rearranging and transforming the equations in step (A) to obtain a successive substitution equation: $b_{[n]}=(c-a^2) \times 2^{2k}+(d-b_{[n-1]}^2)/2^{2(k+1)}$; and (D) giving an initial value to 'b' to execute the successive substitution equation recursively for several times until the equation is convergent, thereby finding 'b'.

In accordance with another aspect of the present invention, the method of the present invention comprises the steps of: (A) assuming the long-bit number to be $c \times 2^{2K}+d$, where c, $d<2^{2k}$, and its square-root solution to be $(a \times 2^K+b)$; (B) determining the solution by respectively finding the value of 'a' and 'b'; (C) finding 'a' by taking the floor value of the square root of 'c'; (D) rearranging and transforming the equations in step (A) to obtain a successive substitution equation: $b_{[n]}=(c-a^2) \times 2^{2k}+(d-b_{[n-1]}^2)/2^{2(k+1)}$; and (E) giving an initial value to 'b' to execute the successive substitution equation recursively for several times until the equation is convergent, thereby finding 'b'.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
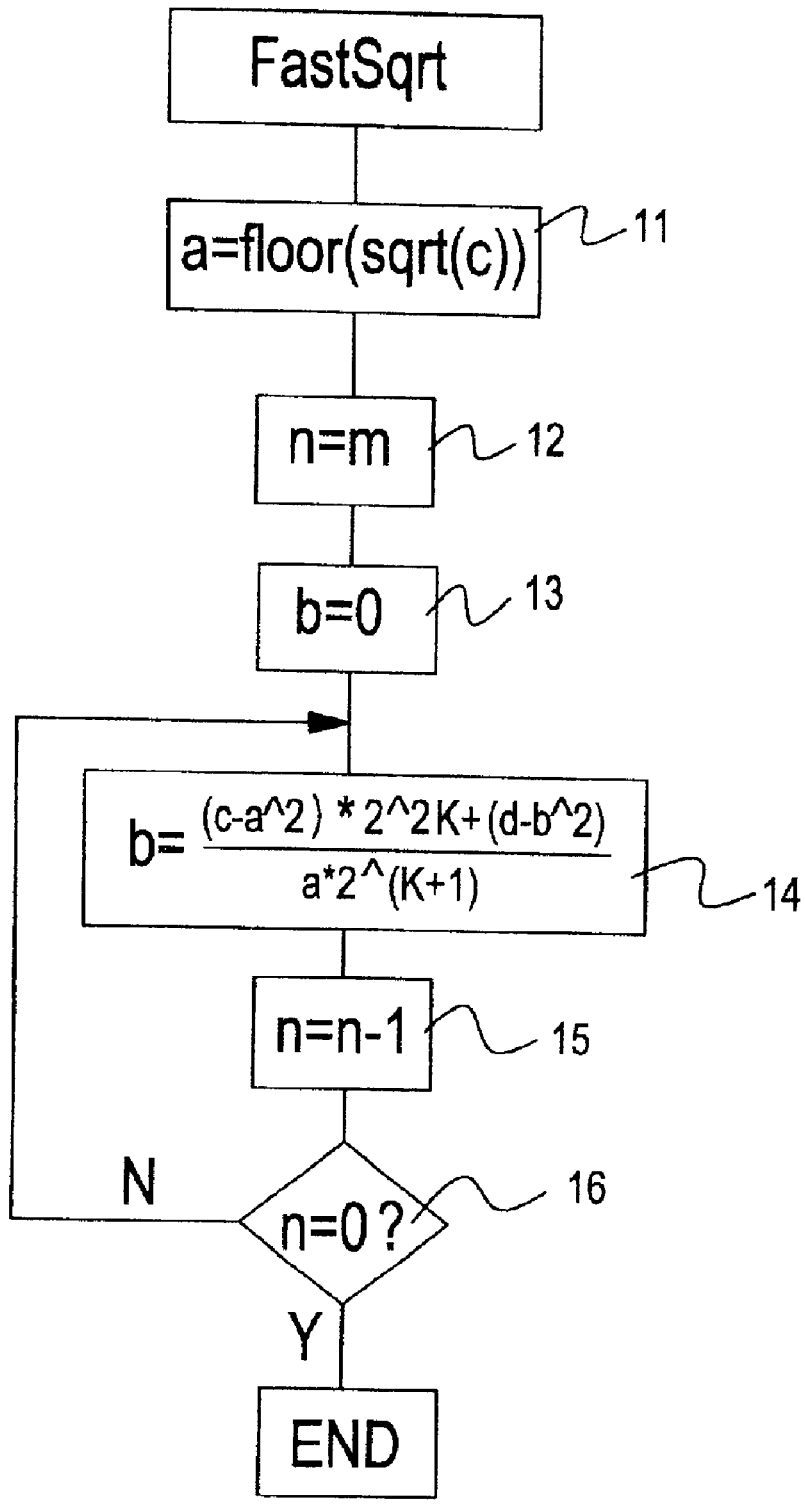
FIG. 1 is a flowchart of the method for determining the square root of a long-bit number using a short-bit processor in accordance with the present invention.

In the method for determining the square root of a long-bit number using a short-bit processor, it is assumed that the long-bit number to be square-root extracted is:

$c \times 2^{2K}+d$, where c, $d<2^{2k}$.

Based on $c \times 2^{2K}+d=(a \times 2^K+b)^2$, it is desired to find 'a' and 'b' (a, $b<2^{2k}$) as follows:

By expanding $(a \times 2^K+b)^2$, we have:

$$(a \times 2^K+b)^2 = (a^2 33\ 2^{2k}+a^2 \times 2^{2(k+1)}b+b^2) = c \times 2^{2K}+d. \quad (1)$$

Due to $b<2^k$, we have:

$$c \times 2^{2K} < (a \times 2^K+b)^2 < ((a+1) \times 2^K)^2. \quad (2)$$

From the equations (1) and (2), we have $a^2<c$ and $c<(a+1)^2$, respectively. Therefore, we have: $a^2<c<(a+1)^2$, which implies that $a<\sqrt{c}<a+1$. As a result, the value of 'a' can be determined by taking the floor value of the square root of 'c'; that is:

$$a = \text{floor}(\sqrt{c}). \quad (3)$$

In equation (3) to determine the square root of 'c', the bisection method can be used to find a maximum value of 'a' that satisfies the condition of $a^2<c$. Therefore, the 'a' in the desired square root is found.

In order to find the 'b' in the desired square root, the equation (1) is rearranged as follows:

$$b=(c \times 2^{2K}+d-a^2 \times 2^{2k}-b^2)/2^{2(k+1)}=(c-a^2) \times 2^{2k}+(d-b^2)/2^{2(k+1)}. \quad (4)$$

The equation (4) is transformed into a successive substitution formula as follows:

$$b_{[n]}=(c-a^2) \times 2^{2k}+(d-b_{[n-1]}^2)/2^{2(k+1)}. \quad (5)$$

In the successive substitution process, 'b' is first assumed to be 0 and applied into equation (5) to find the value of $b_{[0]}$. With the value of this $b_{[0]}$, the successive substitution process is recursively proceeded. In practice, the equation (4) is convergent after two recursive substitutions, and the resultant value is the actual value of 'b'. In a digital simulation, it is known that only three substitutions are required to find the square root of a 32-bit number.

FIG. 1 shows the flowchart of the method for determining the square root of a long-bit number using a short-bit processor, as being derived by the aforementioned equations. Based on the above deriving process, the flowchart is provided to find the square root of a long-bit number by respectively determining the value of 'a' and 'b'. The value of 'a' is first determined by taking the floor value of the square root of 'b' (step 11). Then, steps 12~16 are performed to determine the value of 'b'. In step 12, a loop number 'n' is set to m, where m=3 for a 32-bit long-bit number. In step 13, 'b' is initialized to 0. In step 14, the initial value is applied to the successive substitution formula for determining the value of 'b'. Next, 'n' is decreased by 1 (step 15), and if 'n' is not equal to 0 (step 16), the successive substitution formula is executed repeatedly. After three recursive processes, the execution flow is terminated, and the obtained values of 'a' and 'b' are the solution of the square root.

In case of using an 8-bit processor to find the square root of a 32-bit number, the square root of 'c' in step 11 can be determined by finding a maximum value of 'a' that satisfies the condition of $a^2<c$, using the bisection mehtod. Therefore, the result can be obtained quickly because only one multiplication cycle is required. Furthermore, whenever the division process in step 14 is performed, only one division cycle for dividing a 16-bit number by an 8-bit number is required. In the previous example, step 14 is executed for three times, and thus there are only four execution cycles required in total to find the square root of a 32-bit number. The following table 1 shows a comparison of the present method and the conventional methods:

TABLE 1

| method | multiplication | division | total # of execution |
|---|---|---|---|
| present invention | 1 execution (8 bit × 8 bit) | 1 execution for 3 loops (16 bit/8 bit) | 1 + 3 = 4 |
| Euclid's algorithm | | 2 executions for 2 loops (32 bit/16 bit) | 4 |
| bisection method | 4 executions for 2 loops (16 bit × 16 bit) | | 8 |

As depicted in the table, in using the conventional bisection method, the 16-bit×16-bit multiplication is required, and there are two loops executed, each loop having four execution cycles (a total number of eight execution cycles are required). In using the Euclid's algorithm, the 32-bit/16-bit division is required, and there are two loops executed, each loop having two execution cycles (a total number of four execution cycles are required). In this example, the efficiency of the Euclid's algorithm is similar to that of the present invention. However, when being used in the real-time CD/DVD tracking application, the number of loops for the Euclid's algorithm is larger than 2, whereas that for the present invention is kept to be 3. Therefore, it is known that the method of the present invention is better in decreasing the execution time. In practice, when being applied to the 8051 processor, the method of the present invention can reduce the processing time by 20 percent.

Although the present invention has been explained in relation to its preferred embodiment, it is to be understood that many other possible modifications and variations can be made without departing from the spirit and scope of the invention as hereinafter claimed.

What is claimed is:

1. A method for computing the square root of a long-bit number using a short-bit processor with minimal processing and memory load in a real-time CD/DVD tracking process, comprising the steps of:

(A) representing the long-bit number as a parametric combination of short-bit data components defined by $c \times 2^{2K} + d$, where c, $d < 2^{2K}$, and a square root solution thereof as a parametric combination of short-bit data components defined by $(a \times 2^K + b)$;

(B) computing 'a' by executing in the short-bit processor a bisection method to obtain a floor value for the square root of 'c' and initializing 'b' to a predetermined initial value;

(C) executing in the short-bit processor a digital computation in accordance with a successive substitution condition defined by:
   $$b_{[n]} = (c-a^2) \times 2^{2K} + (d - b_{[n-1]}^2)/2^{2(K+1)};\text{ and}$$

(D) processing a value for 'b' by recursively executing to convergence the successive substitution computation of step (C).

2. The method as claimed in claim 1, wherein, in step (B), the bisection method is executed by the short-bit processor to set a maximum value parameter for 'a' that satisfies the condition of $a^2<c$.

3. The method as claimed in claim 1, wherein, in step (D), the predetermined initial value of 'b' is 0.

4. The method as claimed in claim 1, wherein, in step (D), the successive substitution computation is executed recursively by the short-bit processor at most three times.

5. A method for computing the square root of a long-bit number using a short-bit processor with minimal processing and memory load in a real-time CD/DVD tracking process, comprising the steps of:

(A) representing the long-bit number as a parametric combination of short-bit data components defined by $c \times 2^{2K} + d$, where c, $d < 2^{2K}$, and a square root solution thereof as a parametric combination of short-bit data components defined by $(a \times 2^K + b)$;

(B) computing a solution responsive to computation of values for 'a' and 'b';

(C) computing 'a' by processing in the short-bit processor a floor value for the square root of 'c';

(D) executing in the short-bit processor a digital computation in accordance with a successive substitution condition defined by:
   $$b_{[n]} = (c-a^2) \times 2^{2K} + (d - b_{[n-1]}^2)/2^{2(K+1)};\text{ and}$$

(E) processing a value for 'b' by recursively executing to convergence the successive substitution computation of step (C).

6. The method as claimed in claim 5, wherein, in step (C), a bisection method is executed by the short-bit processor to set a maximum value parameter for 'a' that satisfies the condition of $a^2<c$.

7. The method as claimed in claim 5, wherein, in step (E), the predetermined initial value of 'b' is 0.

8. The method as claimed in claim 5, wherein, in step (E), the successive substitution computation is executed recursively by the short-bit processor at most three times.

\* \* \* \* \*